May 4, 1965  J. KOLBE  3,181,883
VEHICLE WITH CURVE-BANK SUSPENSION
Filed Jan. 15, 1963  5 Sheets-Sheet 1

INVENTOR.
JOACHIM KOLBE
BY
ANDRUS & STARKE
Attorneys

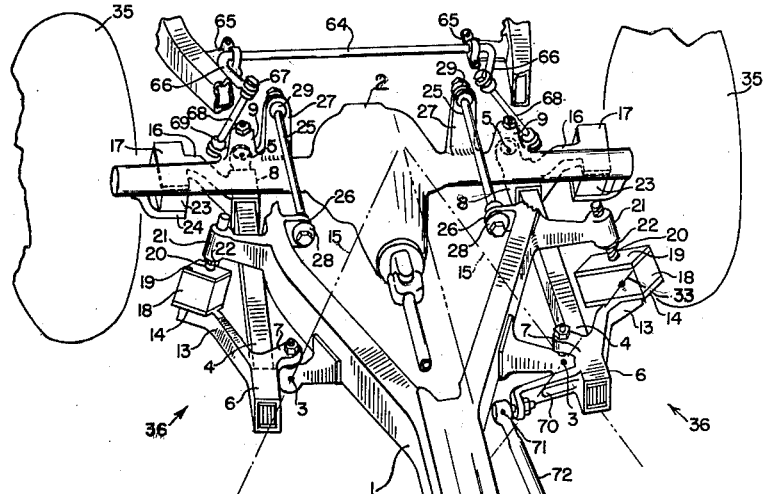
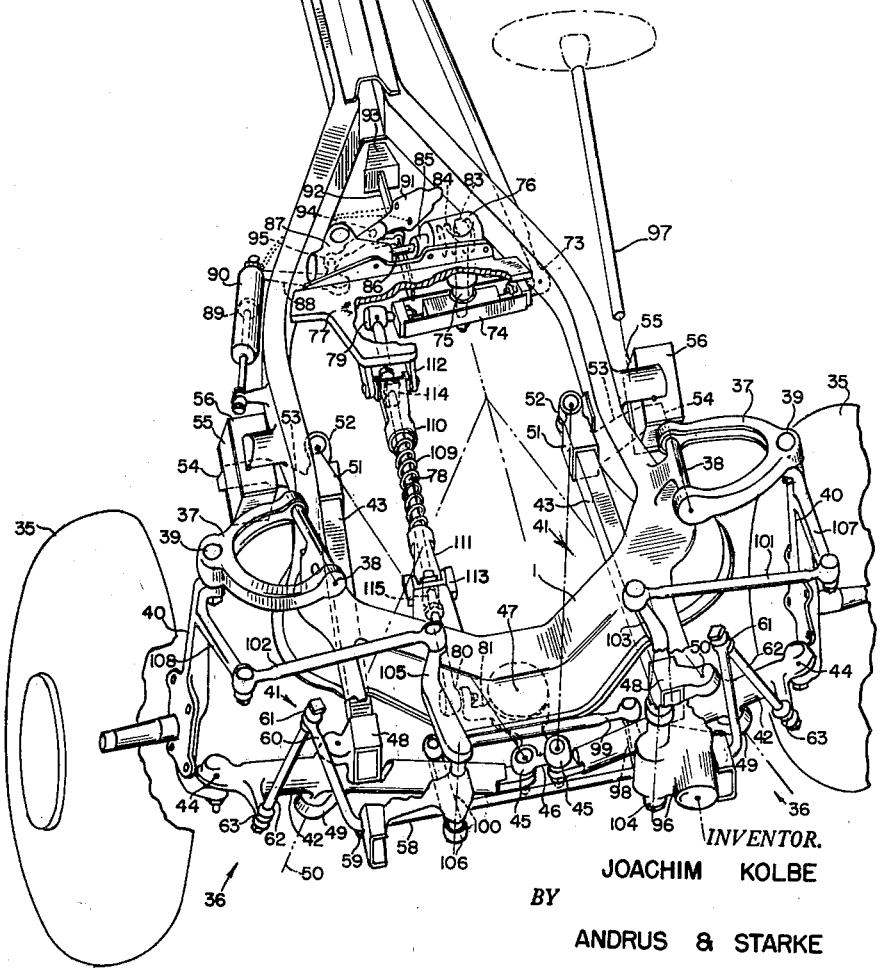
FIG. 2.
INVENTOR.
JOACHIM KOLBE
BY
ANDRUS & STARKE
Attorneys

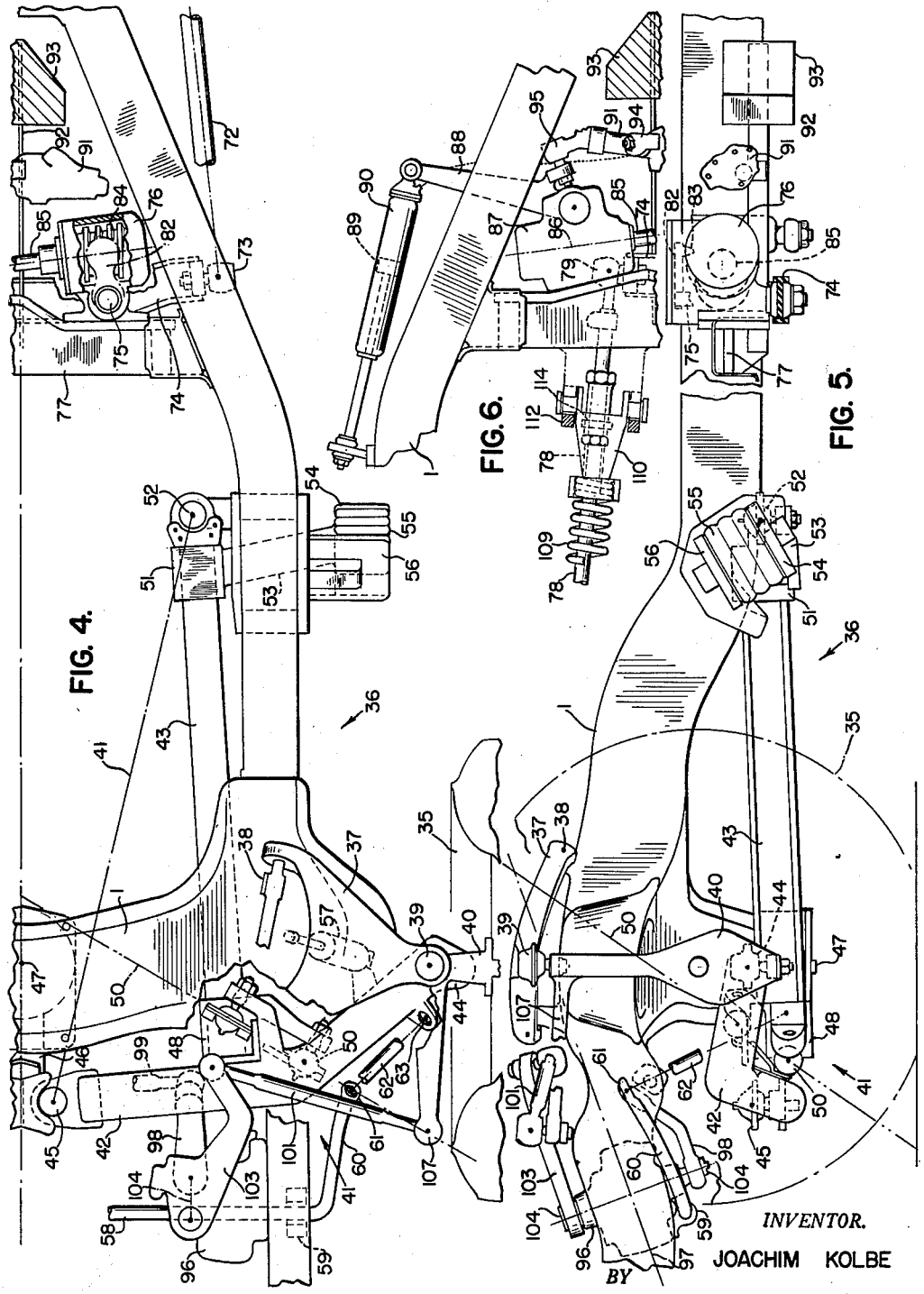

May 4, 1965  J. KOLBE  3,181,883
VEHICLE WITH CURVE-BANK SUSPENSION
Filed Jan. 15, 1963  5 Sheets-Sheet 4
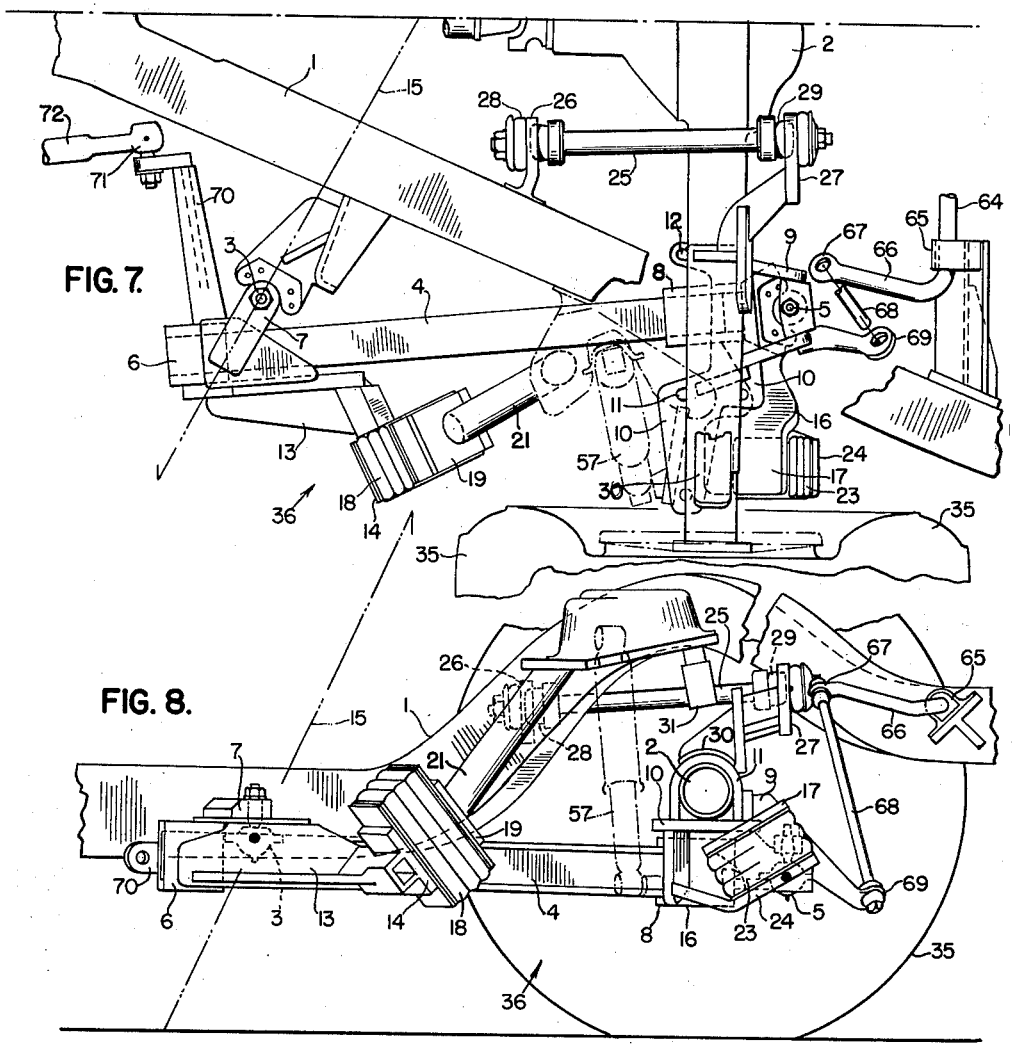
FIG. 7.
FIG. 8.
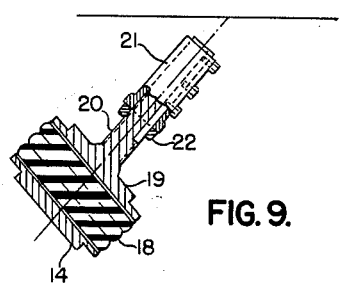
FIG. 9.
INVENTOR.
JOACHIM KOLBE
BY
ANDRUS & STARKE
Attorneys

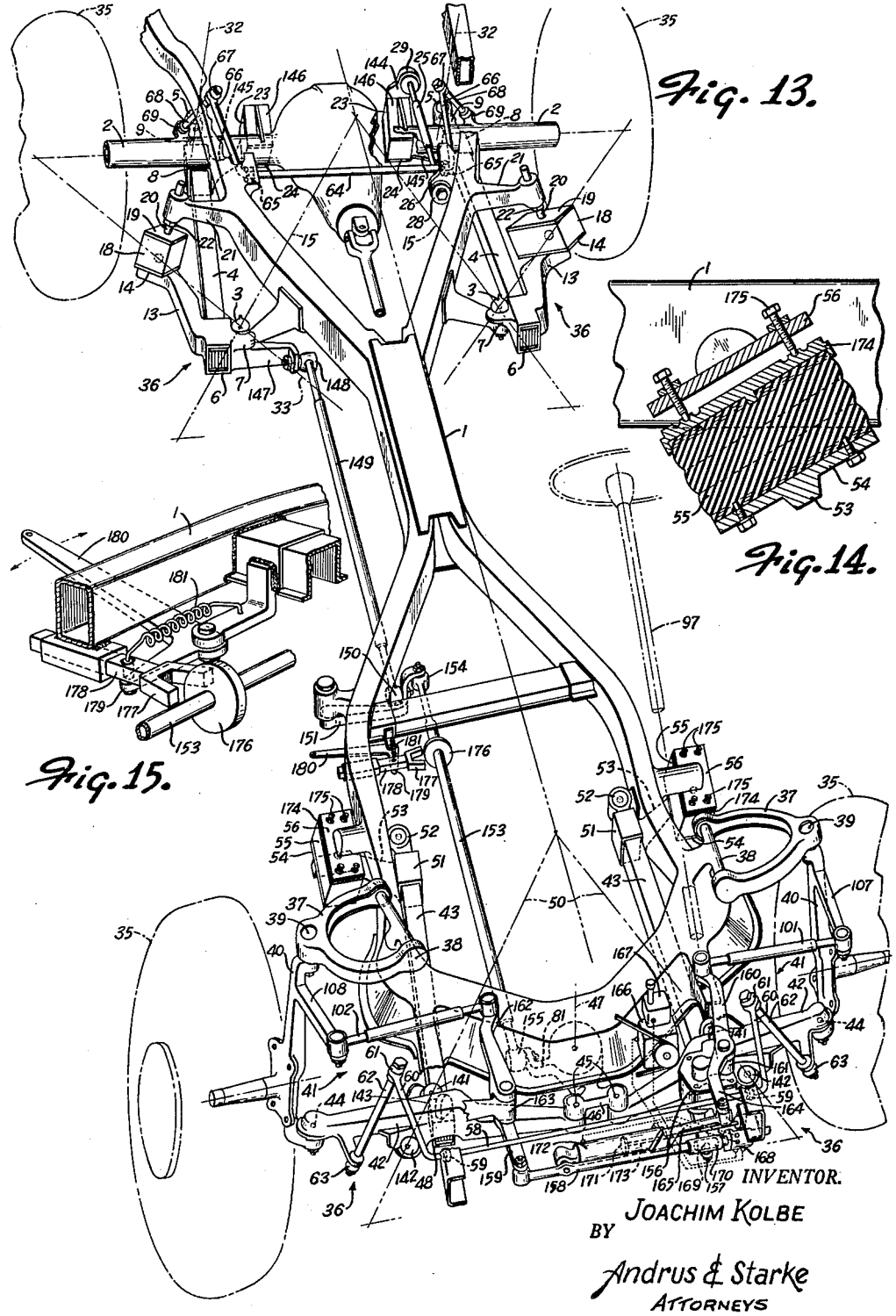

United States Patent Office 3,181,883
Patented May 4, 1965

3,181,883
VEHICLE WITH CURVE-BANK SUSPENSION
Joachim Kolbe, N64 W19425 Mill Road,
Menomonee Falls, Wis.
Filed Jan. 15, 1963, Ser. No. 252,017
24 Claims. (Cl. 280—112)

This invention relates to vehicles with improved automobile suspensions having resilient means interposed between the wheel supporting members and the superstructure. The vehicle may be of the kind in which the superstructure leans outwardly during the curve ride or it may be of the kind for which a banked position is secured for the superstructure. The invention will in both cases result in an improved performance due to revised functioning and to simplified structure of the suspension means.

This application constitutes a continuation in part of application Serial No. 65,204, filed October 26, 1960 by the present inventor for Resilient Guide Means Supported Vehicle, now abandoned in favor of the present application.

Vehicles constructed to bank during curve ride are disclosed in a number of U.S. patents granted to the present inventor. Patent No. 2,820,646, entitled "Dual Turn Shackles for Banking and Non-Banking Vehicles," issued January 21, 1958, and others enumerated in Patent No. 2,820,646, are referred to by way of example.

One of the difficulties in these earlier patent structures was found to arise from an inherent variable and undetermined amount of friction present. Furthermore, high load concentrations in the bearings gave rise to undesirable deflection of certain parts of the guide means and thereby reduced the stability of the vehicle.

The principal object of this invention is the provision of a vehicle running gear for both banking and non-banking vehicles, wherein certain linkage previously believed to be necessary is entirely eliminated, and fraction thereby substantially reduced, and wherein directionally resilient guiding means are provided capable of preventing undesirable deflection while maintaining all of the desired resiliency.

One of the discoveries making possible a simpler and more friction-free structure is the fact that for a typical roll banking arm such as illustrated in FIG. 1 of Kolbe Patent No. 2,820,646, referred to above, comprising at least 6 ball-joints or universally movable bearings, no disturbance of geometry is encountered if the 2 pairs of ball joints forming the dual turn shackles for the arm are replaced by 2 single rubber blocks. Such rubber blocks by themselves are capable of shifting with their respective surfaces uncontrolled in all directions. However, when incorporated in place of the dual turn shackles into carefully selected positions inclined as described hereinafter, they will serve as desired guiding means as long as the remaining 2 ball joints of the roll banking arm are constructed to carry high loads within close tolerances of clearance and as long as the anchoring arms for the rubber blocks are of predetermined constant length.

The second important discovery making possible a simplified structure with greatly reduced friction is the fact, that where a round torsion bar is replaced by a bundle of steel leaves, more steel can be incorporated into the leaf spring bundle thereby increasing the resistance to deflection without affecting the torsion resiliency of the spring, simply by reducing the thickness of the individual leaves and increasing their width.

The positioning of the leaves relative to the main longitudinal and vertical center planes of the vehicle and relative to each other makes possible the build-up of great resistance against undesirable bending deflection within the bundle as described hereinafter, without substantially reducing the torsional resiliency of the spring as a whole.

Another object therefore of the invention is the replacement of the so-called "dual turn shackles" described in Kolbe Patent No. 2,820,646, by simple rubber blocks, hereinafter called "multi-turn cushions," and located in selected places and planes to force selected points of the structure to travel along arcs similar to those formerly travelled by these points as the results of their turn about the prior blanking hinges.

Another object and result of the proposed improved structure is a substantial reduction in cost and weight of the vehicle.

Another object of the invention is a reduction of the vertical space needed between road clearance and vehicle compartment floor to incorporate the needed structure.

Another object is to simplify the mounting of the structure especially where it is incorporated into existing vehicles.

Another object is to arrange a selected number of said multi-turn cushions to provide improved resiliency for the vertical support of the superstructure in both straight ahead and curve ride.

Another object is to provide for a simple resilient and free-of-tackle-effect anchoring of the end sections of the torsion springs and to improve the banking turn travel of selected wheel suspension members.

Another object is the provision of a suitable steering linkage for the vehicle in combination with the suspension and banking means.

Another object is to provide a banking vehicle which can more readily utilize in combination the force diverter means of the Kolbe Patent No. 2,788,986, issued April 16, 1957, and the power assist means of Kolbe Patent No. 2,760,786, issued August 28, 1956, and be used with power stering structures such as shown in Kolbe Patent No. 2,788,984, issued April 16, 1957.

Another object is to provide structure combining controlled resilient resistance means such as multi-turn cushions with linkage geometry designed to lower the superstructure in balance to said resilient resistance means during the banking turn to thereby increase the safety for the vehicle while negotiating turns.

The drawings furnished herewith illustrate the invention as presently contemplated and described hereinafter.

In the drawings:

FIG. 2 is a perspective view of a curve bank vehicle chassis including a suspension and running gear with some of the parts broken away for illustrating purposes;

FIG. 3 is a schematic front elevation of the vehicle having the superstructure mounted as shown in FIG. 2, and turned to a banked position;

FIG. 4 is a top plan view of the left hand front and center district of a curve bank car chassis similar to that shown in FIG. 2;

FIG. 5 is a side elevation of the structure of FIG. 4;

FIG. 6 is a top plan view of the right hand center district of the chassis illustrated in FIG. 4;

FIG. 7 is a top plan view of the left hand rear district of a curve bank car chassis similar to that shown in FIG. 2;

FIG. 8 is a side elevation of the structure of FIG. 7;

FIG. 9 is a detail section taken through an adjustable multi-turn cushion support;

FIG. 10 is an enlarged sectional view through a torsional leaf spring bundle with the leaves placed to furnish the desired torsional resiliency and to retain maximum bending resistance in response to forces typical for the suspension and diagrammatically indicated;

FIG. 11 is a sectional view similar to that of FIG. 10 with a modified arrangement of the leaf spring bundle;

FIG. 12 is an enlarged perspective view of a single multi-turn cushion as employed in the vehicle illustrated in FIG. 2;

FIG. 13 is a view similar to FIG. 2 of a construction of the invention found suitable for passenger automobiles without the necessity of the force diverter and power assist means illustrated in FIG. 2.

FIG. 14 is an enlarged detail view of the adjusting means for compensating one sided loads; and FIG. 15 is an enlarged detail view of the lock for securing the superstructure against lateral shifting.

Figure 1:
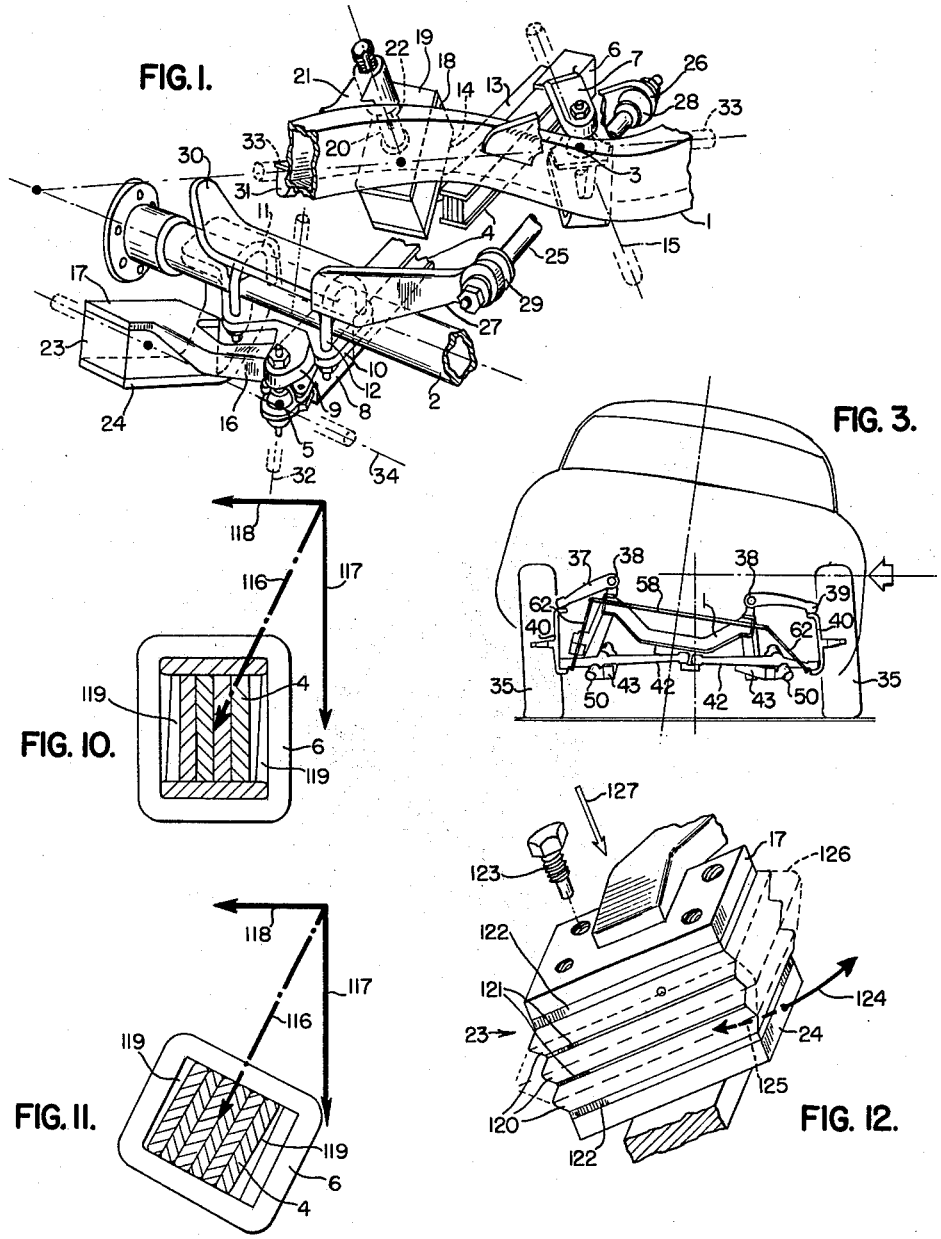
FIGURE 1 is a perspective schematic view of a single roll banking arm assembly extending between a frame and a rigid axle mounted in accordance with the invention.

FIG. 1 illustrates a lefthand roll banking arm extending between the vehicle superstructure frame 1 and a rigid rear axle 2 and comprising a frame supported ball and socket joint 3 connecting the forward end of a torsionally operable leaf spring bundle 4 to the frame, and an axle supported ball and socket joint 5 connecting the opposite end of the bundle 4 to the axle 2.

The leaf spring bundle 4 is anchored at its forward end in an anchor box 6 having an arm 7 connecting the ball and socket joint 3 to that end of the leaf spring bundle 4. An anchor box 8 located at the back end of the spring bundle 4 is connected to the ball and socket joint 5. The joint 5 may be supported by means of the arm 9 from the axle directly, or as shown by the axle plate 10 attached by U-bolts 11 and 12 to the rear axle 2, as where the structure is constructed to be mounted on existing vehicles.

The anchor box 6 forms an integral part with an outwardly and backwardly extending arm 13. The outer end of arm 13 forms a carrier plate 14 lying with its surface in a plane extending substantially perpendicular to the theoretical axis 15 which becomes in effect thereby the rear banking hinge axis for that side of the vehicle.

The anchor box 8 has an integral sidewardly and upwardly extending arm 16. The outer end of arm 16 forms a carrier plate 17 extending with its surface inclined to the road and with its forward end arranged lower than its rearward end while the vehicle is viewed in side elevation, and extending substantially horizontally in its transverse outline with the vehicle viewed in rear elevation.

The carrier plate 14 located near the forward end of the banking arm carries the multi-turn cushion or rubber block 18 which is confined between it and a frame supported support plate 19 which in turn extends substantially parallel to plate 14 and is illustrated as being adjustable in its position relative to the frame by a threaded bolt 20 shown in detail in FIG. 9 as rigidly attached to plate 19 and arranged to slide without turning by means of a key (not shown) within the frame bracket 21. A turn of the adjustment nut 22 on bolt 20 will raise or lower the plate 19 along an axis which should extend substantially parallel to the banking hinge axis 15. In FIGS. 7 and 8 the bracket 21 is shown without illustrating the bolt 20 for adjustably securing it to the plate 19.

The carrier plate 17 located near the back end of the banking arm rests against the multi-turn cushion or rubber block 23 which in turn is supported by a support plate 24 extending rearwardly from the axle 2 directly or, as shown, from the axle plate 10, where the structure is constructed to be mounted on existing vehicles. The support plate 24 extends substantially parallel to the carrier plate 17 and confines the block 23 therebetween.

An upper link 25 supported by a frame bracket 26 and an axle bracket 27 connects the frame 1 with the axle 2 by universally movable mountings such as rubber bearings 28 and 29 respectively. The link 25 is vertically spaced relative to and extends substantially parallel to the spring bundle 4.

The axle bracket 27 is illustrated as supported by an upper stop plate 30 welded to the U bolts 11 and 12.

Stop plate 30 carried by the axle 2 and stop member 31 on the frame 1 may be provided to engage each other during full bounce of the superstructure and thereby limit vertical oscillation of the superstructure.

The axis 15 determines by its extension through the ball and socket joint 3 and by its selected inclination relative to the main horizontal and vertical planes of the vehicle the geometric travel path of the ball joint 5, and in correlation with corresponding structure located on the other side of the vehicle the banking movement of the superstructure relative to the rear axle during curve ride of the vehicle.

The multi-turn cushion or rubber block 18, firmly mounted between carrier plate 14 and support plate 19 will during operation of the device deflect in such a way as to cause the carrier plate 14 to move backwardly and downwardly and somewhat inwardly relative to ball joint 3 on the curve outside and in the opposite directions on the curve inside, whenever the vehicle negotiates a turn. The movements of the rear axle relative to the superstructure or vice versa will be substantially the same as those explained in Kolbe Patent No. 2,820,646, referred to above where such movements are secured by dual turn shackles.

Slight losses due to deformation in the rubber blocks during curve ride, additionally compressing the rubber on the curve outside and reducing compression on the curve inside and thereby reducing the banking effect for the vehicle can be compensated for by designing the spring bundle resiliency correspondingly stiffer, since similar dependency between the two means of resiliency, steel and rubber springs exist in straight ahead ride. A desired wheel rate can therefore be maintained.

A theoretical axis 32 can be established extending through the axle ball joint 5 perpendicular to carrier plate 17 and geometrically correlated to the axis 15.

The carrier plate 17 is arranged inclined as described to avoid or at least greatly reduce any loss in torsional windup of spring 4 resulting from the turn of the banking arm relative to the vehicle superstructure. The arm 16 turning about the axis 15 in space during the banking turn of the superstructure would maintain a position substantially parallel to the axle as appearing in rear elevation with corresponding windup loss in the torsion spring bundle 4, since the superstructure supported end of the spring tends to unwind the spring on the curve outside and increase the windup on the curve inside if the outer end of plate 17 would not be forced to move upwardly while moving backwardly on the curve outside, and not be forced to move downwardly while moving forwardly on the curve inside substantially maintaining thereby the desired windup in the torsion spring bundle.

During oscillation of the axle relative to the superstructure, as it might occur in straight ahead ride, an upward movement of the axle will wind up the backward end of the torsion spring bundle clockwise, due to the inclination of the true oscillation turning axis 33 for the roll banking arm illustrated extending through the ball joint 3 and the center of the multi-turn cushion 18, relative to the center line of the rear axle or the axis 34 extending parallel thereto through ball joint 5 and the center of the multi-turn cushion 23. This inclination is secured by keeping the distance from the center of the multi-turn cushion 23 to the center of the multi-turn cushion 18 shorter than the distance between the ball and socket joints 3 and 5.

An upward turn of the axle 2 shown in FIG. 1 would therefore tend to move the center section of axle 2 higher than the outward section located toward the wheel, and only a clockwise windup of the backward end of the torsion leaf spring bundle relative to its forward end would enable the axle to shift into an elevated but still horizontal position relative to the road.

For the forward end of the rear roll banking arm illustrated the axes 15 and 33, both intersecting in the center of ball joint 3, and axis 33 intersecting the center of multi-turn cushion 18, provide in effect a theoretical universal joint similar to that illustrated in dotted outline in FIG. 1 of Kolbe Patent No. 2,820,646, referred to above. At the rear end of the same banking arm the axes 32 and 34 provide a similar theoretical rear universal joint as indicated in said patent disclosure. The multi-turn cushions 18 and 23 and the leaf bundles 4 provide directionally resilient guide means, characteristic of the invention.

Referring to FIG. 2, the body or superstructure having a chassis or body support frame 1 is supported by wheels 35 on the road. The wheels 35 are arranged in pairs, one pair at the front end and the other pair at the rear end of the vehicle. The wheels of each pair are disposed on opposite sides of the superstructure and are equally spaced from the longitudinal vertical center plane of the vehicle.

The wheels 35 are secured to the superstructure 1 by wheel or axle carriers 36 which provide for a substantially vertical oscillation of each wheel relative to the superstructure. The carriers 36 are arranged in pairs similar to the wheels and each pair is employed for connecting the corresponding pair of wheels to the superstructure.

The front wheels 35 and their corresponding wheel carriers 36 form a front pair of effective multi-turn cushion controlled roll banking arms supporting the front end of the superstructure. Each front wheel carrier 36 comprises an upper control arm 37 pivotally attached to the frame 1 by the substantially longitudinally extending hinge 38 and connected by the ball and socket joint 39 to a wheel supported member 40 which also serves as a steering kingpin. In addition, each carrier 36 has a lower suspension arm unit 41 comprising a transversely extending leg 42 and a longitudinally extending leg 43. Leg 43 also serves as a vehicle main support torsion spring for the corresponding share of the weight of the vehicle.

The transversely extending leg 42 of each lower suspension arm 41 is pivoted at its outer end by the universally movable ball and socket joint 44 to the wheel supported spindle member 40, and at its inner end by the universally movable ball and socket joint 45 to a longitudinally extending lever 46 pivoted by a substantially vertically placed pivot 47 to the frame 1. Lever 46 serves both transversely extending legs 42 as a common inner end support.

The longitudinally extending legs 43 each constitute a torsionally stressed leaf spring bundle anchored at its forward end into the anchor box 48 which forms a hinged fork 49 shaped to carry the hinge 50 which serves as a kingpin banking hinge for that section of the vehicle. The hinge 50 may also be constructed by placing 2 ball and socket joints spaced apart along the hinge line.

Kingpin banking hinges and their functions are disclosed and described in Kolbe Patent No. 2,739,658, issued March 27, 1956.

The backward end of each torsional leaf spring bundle 43 located at either side of the vehicle is anchored into the corresponding anchor box 51 supported and secured by a ball and socket joint 52 to the frame 1. Each anchor box 51 forms an integral part with an outwardly extending anchor arm 53. The outer end of arm 53 forms a carrier plate 54 extending longitudinally with its surface inclined preferably about 30° to the road and its forward end placed lower than its rearward end while the vehicle is viewed in side elevation, and extending substantially horizontally in a transverse direction.

The carrier plate 54 carries the multi-turn cushion 55 which rests against the frame-supported support plate 56, which in turn extends substantially parallel to the carrier plate 54.

The positioning of the multi-turn cushion 55 in an inclined position results in improved resistance against loss of torsional deflection of the corresponding leaf spring bundle 43 during the banking turn of the superstructure, as described above for a typical rear roll banking arm.

The kingpin banking hinge 50 at the forward end of the torsion leaf spring bundle 43 contributes only part of the banking guidance in the chassis illustrated, while the multi-turn cushion 55 at the rear end of the spring 43 in combination with the support ball joint 52 secures the rest of the guidance for each corresponding side of the vehicle.

The kingpin banking hinge 50 for each carrier preferably extends inclined towards the longitudinal and transverse center planes intermediate the front wheels 35 of the vehicle, and is supported by the transversely extending leg 42 to which it is connected as described above to permit a turn of the torsion spring 43 about the axis of the kingpin banking hinge 50.

The rear axle carriers 36 illustrated in FIG. 2 each comprise an upper torque rod or link 25 connected by a universally movable joint 28 at its forward end and bracket 26 to the frame 1 and at its rear end by means of a universally movable joint 29 and axle bracket 27 to the rigid axle housing 2 respectively.

Each carrier 36 further comprises a longitudinally extending torsion leaf spring bundle 4 serving as a lower suspension arm and connected at its forward end through anchor box 6 and arm 7 by the ball and socket joint 3 to the frame 1, and at its rear end through the anchor box 8 and arm 9 by the ball and socket joint 5 to the axle 2.

Multi-turn cushions 18 are placed a selected distance away from and extend with their support surfaces perpendicular to effective banking axes 15 which intersect the centers of the ball and socket joints 3. The lower carrier plates 14 for the multi-turn cushions 18 are supported by the arms 13 extending outwardly and rearwardly at approximately 45° from the anchor boxes 6 located at the forward ends of the torsional leaf spring bundles 4.

The multi-turn cushions 18 are supported against upper support plates 19 which are rigidly connected to threaded adjustment shafts 20 carried by the frame brackets 21 and regulated in their vertical positions by the adjustment nuts 22 as described above.

The multi-turn cushions 23 are also placed a selected distance away from and extend with their support surfaces perpendicular to effective axle banking hinge axes 32 which intersect the ball joints 5 as described for the structure illustrated in FIG. 1.

The carrier plates 14 for the multi-turn cushions 23 are supported by the arm 16 extending, in the modification illustrated in FIG. 2, from the anchor boxes 8 outwardly and substantially parallel to the axle 2.

The multi-turn cushions 23 are supported by support plates 24 which are rigidly connected to the axle 2.

The arms 16 could be arranged to rest against the multi-turn cushions 23 which in turn would lean against the support plates 24 with the members 16, 23 and 24 arranged inwardly instead of outwardly relative to the ball joints 5 where clearance problems make such arrangement more desirable.

The rear axle suspension may be applied in principle for the support of the front end of the vehicle also, instead of the independent wheel suspension illustrated in FIG. 2.

A sway bar 58 is attached in the front of the vehicle to the frame 1 by the bearings 59. The outer ends of the sway bar 58 form longitudinally extending sway bar arms 60 which are connected by pivotal or rubber bearings 61 to inclined sway bar shackles 62. The shackles 62 are connected by pivotal or rubber bearings 63, which are spaced farther apart than the upper shackle bearings 61 to the outer ends of the transversely extending legs 42 of the lower front suspension arms 41.

In the rear of the vehicle, a similar sway bar 64 may be added and is illustrated as being attached by the bearings 65 to the frame 1. The sway bar 64 has longitudinally extending arms 66 on either end, which are connected by upper pivotal or rubber bearings 67 to inclined shackles 68 with lower pivotal or rubber bearings 69 also spaced farther apart than the upper pivots 67 connecting the shackles 68 to the rear axle housing 2.

The front and rear wheel carriers 36 should be connected to operate in unison in curve banking, as shown in earlier patents such as Kolbe Patent 2,788,984, referred to above.

The rear suspension forward anchor box 6 located on the left side of the vehicle of the embodiment shown in FIG. 2 carries an arm 70 extending inwardly with the ball and socket joint 71 on its end placed in or near the theoretical axis 33 which extends through the rear frame supported ball joint 3 and through the approximate center of the multi-turn cushions 18. This arm 70 constitutes part of a tie, provided in effect between the front and rear pairs of wheels to secure proper track holding for the vehicle.

A longitudinally extending tie rod 72 is connected at its rear end to arm 70 by the ball and socket joint 71, and its forward end to the lever 74 by a ball and socket joint 73. The lever 74 extends substantially horizontally and transversely and is disposed to turn about a substantially vertically extending pivot 75 supported by housing 76 attached to the cross member 77 of the frame 1.

A second longitudinally extending tie rod 78 carrying at its rear end the ball and socket joint 79 which is supported by the free arm of the lever 74 and carrying at its forward end the ball and socket joint 80, interconnects the lever 74 with a transversely extending lever 81 forming a bellcrank to the centrally located lever 46 in the front of the vehicle.

The shaft 75 supported by the gear housing 76 comprises at its upper end a rearwardly extending arm 82 carrying a roller stud 83 and constitutes a cam lever which engages the nearly irreversible worm gear 84. The horizontally and transversely extending main shaft 85 of the worm gear 84 engages or is part of a worm gear shaft 86 carrying a ball-nut steering gear 87 which serves as a reduction gear operated by the turn of the lever 88 to obtain a selected number of turns of the worm gear 84 during a pre-designed segmental turn of the lever 88.

The turn of the lever 88 takes place in response to hydraulic pressure against the piston 89 sliding within the piston housing or cylinder 90 and regulated in its movements by a control valve unit 91 carried by the frame supported rearwardly extending vertically spaced single leaf spring 92 which also supports on its rearward end a weight block 93 which swings sidewardly in response to side forces such as centrifugal force created during curve ride of the vehicle.

The lateral shifting of the weight block 93 in response to centrifugal forces on a curve causes a bending of the spring leaf 92 and, to a somewhat smaller degree, a lateral shifting of the control valve unit 91 which is mounted on the leaf spring by a ball and socket joint 94 and has a valve situating member 95 connected to the lever 88 at a selected distance from the ball joint 94 by a second ball and socket joint to secure a "follow-up" effect during operation of this power-assist release mechanism. The lateral shifting of the control valve unit 91 and its operation is substantially identical to that provided in the well known hydraulic power assists for vehicle steering mechanism, as indicated herein by valve 168, hereinafter described. Instead of a force exerted by the driver on the steering wheel, the lateral shift of weight block 93 in response to centrifugal forces secures the desired lateral displacement of the ball joint 94 of valve unit 91.

Lateral movement of valve unit 91 relative to member 95 feeds hydraulic fluid to a corresponding end of cylinder 90, thereby actuating arm 88 in a direction which returns the valve to open drain position by follow-up or servo action. Movement of arm 88 in either direction effects a corresponding turning of worm gear 84 in a direction that permits stud 83 to move to the right or left as the case may be during banking of the vehicle.

This apparatus constitutes a force diverter mechanism similar to that disclosed in Kolbe Patent No. 2,788,986, and serves to permit lateral movement between vehicle frame 1 and the running gear described only when the weight block 93 shifts laterally under the influence of side forces or centers itself back into its static position under the influence of the centering power of the spring leaf 92 once side forces are no longer active.

A car engine supported and operated hydraulic pump provides the necessary hydraulic pressure for operation of the apparatus.

The vehicle illustrated constitutes a banking car and operates as follows:

When the vehicle is driving into a curve, the inclined shackles 62 and 68 for the corresponding sway bars 58 and 64 located in the front and in the rear of the vehicle respectively will be compressed where located on the curve outside and operated in tension where located on the curve inside. Reaction loads on the frame 1 are transmitted by the sway bars 58 and 64 and will tend to lift the superstructure on the curve outside and to lower it on the curve inside and thereby turn the superstructure about an effective longitudinally extending banking motion center located approximately in height of the mass center of the superstructure.

In order to compensate for loss of direction of the superstructure relative to its own track, as is typical for cars with independently suspended front wheels and a rigid rear axle, the geometry of the curve bank car can be worked out to secure a corresponding correcting "pull-in" for the front end of the vehicle, while the rear end is allowed to move somewhat outwardly during its roll banking turn.

This turn will be part of a lateral shifting of the lower part of the superstructure towards the curve outside and, to a greater extent, due to the greater height, a shifting of the upper part of the superstructure to the curve inside.

All hinged connections between the longitudinally extending and the transversely extending suspension members such as the banking kingpin hinges 50 in the front and the support ball joints 5 in the rear of the vehicle will operate but substantially keep their axial positions relative to the road. All hinged connections between the longitudinally extending suspension members and the frame 1 however, such as the support ball joints 52 in the front and the support ball joints 3 in the rear will both operate and simultaneously travel with the shifting frame 1 into the banked position.

Since the banking geometry, determined in substance by the inclination of the banking hinges and the sway bar shackles, is such that a turn is secured large enough in degrees to compensate for the outward lean of the superstructure normally taking place and to add an amount of turn of corresponding size in degrees in order to secure actual banking, the torsional leaf spring bundles 43 in the front and 4 in the rear will at the end of the banking turn be stressed approximately the same amount as is typical for non-banking vehicles negotiating curves under equal conditions.

The superstructure, for instance, might turn during average and safe speed for a given curve 16° about its banking motion center and simultaneously be allowed to lose 8° due to the spring deflection with a resulting actual banked position of 8°.

The desired turn of the superstructure can occur because the shifting of the release weight block 93 under the influence of centrifugal force operates the lever 83 which by means of the reduction gear unit 87 speeds up and turns the substantially irreversible worm gear 84. The turn of the worm gear 84 operates the double lever 74, permitting a longitudinal shifting of the tie rods 72 and 78 and therewith the lateral shifting of the lower part of the superstructure relative to the wheels and the rolling of the entire superstructure into the desired banked position.

In FIG. 2, the front wheels 35 of the vehicle illustrated are shown as being steered by steering linkage comprising a steering gear 96 supported by the frame 1 and operated from the driver's steering handwheel through the steering column 97. A Pitman arm 98 extends backwardly to support a central tie rod 99 by means of a typical ball and socket joint. The tie rod 99 is supported on its free end by means of a ball and socket joint and a frame carried support lever 100 arranged to extend and swing substantially parallel to the Pitman arm 98.

In order to keep the steering system free of interference from the banking turn of the superstructure during curve ride, the outer wheel tie rods 101 and 102 are placed substantially in the height of the upper front suspension control arms 37 which in effect constitute a neutral zone since no lateral shifting but only conventional vertical oscillation takes place between frame 1 and the ball joint 39 carried by the spindle member 40 during the banking turn of the superstructure.

A second upper Pitman arm 103 is carried by the Pitman arm shaft 104 of gear 96 and in outline and position coordinated to the overall steering geometry requirements and to a corresponding second upper support lever 105 located above the support lever 100 on the other side of the vehicle. A common lever shaft 106 supports the support levers 100 and 105 and extends parallel to the Pitman arm shaft 104.

The outer ends of the wheel tie rods 101 and 102 are connected by ball and socket joints to the left and right steering arms 107 and 108 respectively, also placed approximately in the height of the outer ends of the upper control arms 37 supported by the corresponding wheel spindle members 40. The arms 103 and 105 are connected by means of ball and socket joints to the corresponding inner ends of the respective wheel tie rods 101 and 102.

A curve bank car such as illustrated in FIG. 2 in order to perform with maximum benefit and beauty of motion should be designed somewhat more sensitive to one-sided loads similar to a small airplane or boat. To provide an adjustment means for regulating permanent one-sided loads and lateral shifts resulting, for instance, from car engine torque, from driving mostly on one side of crowned roads or from supporting an unusually heavy driver, a centering tension coil spring 109 is illustrated as incorporated into the chassis structure of the vehicle. Carried by anchor members 110 and 111, the spring winds around the forwardly located tie rod 78 and is kept in a pre-stressed position by pairs of hook-like brackets 112 and 113 against which the respective anchor members 110 and 111 rest in static position.

The tie rod 78 is provided with vertically extending pull plates 114 and 115 leaning in static position against the respective anchor members 110 and 111.

Whenever the tie rod 78 moves fore or aft during the corresponding banking turn of the superstructure, one of the pull plates moves the related anchor and spring end into the direction of the movement of the tie rod away from its hook bracket and increases the tension in the spring accordingly. However, it is the initial spring tension which will exert the beneficial erecting force of the vehicle.

Since experience shows that for a symmetrically built vehicle of the kind described above the tendency prevails for the superstructure to hang downwardly out of center with its left side, the forwardly located hook bracket 113 might be entirely eliminated and the forward end of the tension spring 109 might be anchored directly to the tie rod 78, securing a constant pull on the suspension in the direction only which tends to lift the left side of the vehicle.

An initial somewhat unsymmetrical design of the complete apparatus or selected parts thereof will also solve this particular problem of centering the superstructure.

FIG. 3 is a front elevation of related outline and structure of the vehicle shown in FIG. 2 with the superstructure shown in a banked position and with some of the front running gear in a location typical during the banking turn. Identical reference numbers are applied to facilitate comparison between FIGS. 2 and 3.

FIGS. 4 to 9 disclose one practicable geometric system for the chassis similar to that illustrated in the perspective drawing FIG. 2. All reference characters relating to identical parts in the illustration of FIG. 2 are repeated in FIGS. 4 to 9 to facilitate the understanding of the relationship of the chassis. Acceptable locations for front and rear shock absorbers 57, which are not illustrated in the perspective drawing FIG. 2 are disclosed in FIGS. 4, 7 and 8 arranged to follow the banking movement of the superstructure freely.

FIG. 10 is a sectional view through a torsional leaf spring bundle such as that illustrated in FIG. 1 as anchored in the anchor box 6. Since for reasons explained above the multi-turn cushion 18 is arranged inclined as described, bending forces are exerted on the leaf spring bundle 4 as diagrammatically indicated by force arrow 116 resulting in a larger vertically active component force 117 and a smaller horizontally active component force 118.

By selecting a torsion spring for each curve bank car banking arm composed of single leaves and by arranging the leaves as shown in FIG. 10 to give maximum bending resistance in both the vertical and the horizontal plane and in proportion to the active forces, it is possible to keep the running gear free of additional linkage to resist bending without sacrificing the desired resiliency with regard to wheel oscillation. For one correct round steel torsion bar diameter to meet a desired wheel rate there are now a multitude of leaf bundle arrangements available. The selection is of still greater variety since even for a given length of a spring the choice of width and thickness of a single leaf will both change the rate, and the number of leaves will establish a desired end result.

FIG. 11 is a modification and simplification of the arrangement illustrated in FIG. 10 with the leaves of the bundle placed in the direction of the resultant force 116 to secure maximum bending resistance, where the variations in size of the component forces 117 and 118 are small, such as for an application of the curve bank car suspension with restricted banking effect.

As shown in both FIGS. 10 and 11, side shims 119 may be placed into the anchor box which permit change in windup of the leaves by giving the shims a triangular cross-sectional shape. Since an additional 3° angular windup of the spring bundle accounts for approximately one inch car lift, the changing of the shims from the position shown in FIG. 10 to that shown in FIG. 11 where the leaves are shown as being 3° inclined relative to the anchor box, will produce the desired adjustment.

FIG. 12 shows a typical multi-turn cushion 23 such as those shown in FIG. 1, and its proposed build-up designed to combine minimum deflection in response to compression loads with desired larger deflection in response to lateral shifting of the upper carrier plate 17 relative to the lower support plate 24.

The rubber block 23 constitutes a sandwich made up of a number of layers 120 of cured rubber of medium durometer hardness vulcanized to intermediate layers of selected belting 121 of sufficient strength to resist stretching under compression loads within the block and of an upper and a lower layer of selected belting 122 of sufficient strength and thickness to resist shear forces active when the mounting of the rubber on the support and carrier plates is secured by mounting bolts similar to those shown at 123.

Force arrows 124 and 125 indicate the desired shifting of plate 24 relative to plate 17. Without the inserts 121 a block of rubber of the same volume as the combined three rubber layers shown would deflect under compression load as indicated in dotted outline 126 with a resulting loss in height (not shown) and increase in length and width of the center section. Such increase would constitute interference with needed clearances for the banking movement of neighboring parts while loss in height would reduce the freedom for lateral shifting due to bulging and extreme rubber surface loading and would also reduce the angular movement within the related ball and socket joints during the banking turn.

The two inserts 121 arranged between the three rubber layers 120 each for instance of one inch thickness would for a cushion of five inch length and three inch width improve the height maintained under maximum compression load by 40% and would solve clearance problems to an even greater degree.

The arrow 127 indicates the direction of loading for the cushion during static position of the vehicle, and is referred to hereinafter as "load axis." The multi-turn cushions within the banking apparatus are, as a rule, placed with their respective load axes extending substantially parallel to the more vertically extending load axes of the correlated effective banking universal joints referred to above, while the more horizontally extending corresponding axes of said effective banking universal joints intersect the approximate centers of the multi-turn cushions to form the corresponding oscillation axes for the oscillation of the wheels and wheel suspension members.

The multi-turn cushions illustrated have been found to prevent vibration and lateral instability of the superstructure, thereby eliminating the necessity for using force diverter means in most vehicles. Such elimination frees the suspension additionally for banking and greatly reduces the cost.

An embodiment thus eliminating the use of a force diverter and of power assist means is illustrated in FIG. 13. Referring to this figure, all reference numbers relating to identical parts shown in the illustration of FIGS. 1 and 2 are repeated in FIG. 13 to facilitate the understanding of the functioning of the apparatus.

The body or superstructure having a chassis or body support frame 1 is supported by wheels 35 on the road. The wheels 35 are arranged in pairs, one pair at the front end and the other pair at the rear end of the vehicle. The wheels of each pair are disposed on opposite sides of the superstructure and are equally spaced from the longitudinal vertical center plane of the vehicle.

The wheels 35 are secured to the superstructure 1 by wheel or axle carriers 36 which provide for a substantially vertical center plane of the vehicle.

The wheels 35 are secured to the superstructure 1 by wheel or axle carriers 36 which provide for a substantially vertical oscillation of each wheel relative to the superstructure. The carriers 36 are arranged in pairs similar to the wheels and each pair is employed for connecting the corresponding pair of wheels to the superstructure.

The front wheels 35 and their corresponding wheel carriers 36 form a front pair of effective multi-turn cushion controlled roll banking arms supporting the front end of the superstructure. Each front wheel carrier 36 comprises an upper control arm 37 pivotally attached to the frame 1 by the substantially longitudinally extending hinge 38 and connected by the ball and socket joint 39 to a wheel supported spindle member 40 which also serves as a steering kingpin. In addition, each carrier 36 has a lower suspension arm unit 41 comprising a transversely extending leg 42 and a longitudinally extending leg 43. Leg 43 also serves as a vehicle main support torsion spring for the corresponding share of the weight of the vehicle.

The transversely extending leg 42 of each lower suspension arm 41 is pivoted at its outer end by the universally movable ball and socket joint 44 to the wheel supported spindle member 40, and at its inner end by the universally movable ball and socket joint 45 to a longitudinally extending lever 46 pivoted by a substantially vertically placed pivot 47 to the frame 1. Lever 46 serves both transversely extending legs 42 as a common inner end support.

The longitudinally extending legs 43 each constitute a torsionally stressed leaf spring bundle anchored at its forward end into the anchor box 48 which is connected by the ball joints 141 and 142 to the transversely extending leg 42. The ball joints 141 and 142 are placed a selected distance apart along the hinge line 50 and provide a kingpin banking hinge 143 for that section of the vehicle.

Kingpin banking hinges and their functions are disclosed and described in Kolbe Patent No. 2,739,658, issued March 27, 1956.

The backward end of each torsional leaf spring bundle 43 located at either side of the vehicle is anchored into the corresponding anchor box 51 connected by a ball and socket joint 52 to the frame 1. Each anchor box 51 forms an integral part with an outwardly extending anchor arm 53. The outer end of arm 53 forms a carrier plate 54 extending longitudinally with its surface inclined preferably about 30° to the road and its forward end placed lower than its rearward end while the vehicle is viewed in side elevation, and extending substantially horizontally in a transverse direction.

The carrier plate 54 carries the multi-turn cushion 55 which rests against the frame-supported support plate 56, and which in turn extends substantially parallel to the carrier plate 54.

The positioning of the multi-turn cushion 55 in an inclined position results in improved resistance against loss of torsional deflection of the corresponding leaf spring bundle during the banking turn of the superstructure, as described above for a typical rear roll banking arm.

The kingpin banking hinge 143 at the forward end of the torsion leaf spring bundle 43 contributes only part of the banking guidance in the chassis illustrated, while the multi-turn cushion 55 at the rear end of the spring 43 in combination with the support ball joint 52 secures the rest of the guidance for each corresponding side of the vehicle.

The kingpin banking hinge 143 preferably extends inclined toward the longitudinal and transverse vertical center planes of the vehicle, and is supported by the transversely extending leg 42 to which it is connected as described above to permit a turn of the torsion spring 43 about the axis of the kingpin banking hinge.

One of the rear axle carriers 36 illustrated in FIG. 13 has an upper torque rod or link 25 connected at its forward end by universally movable joint 28 and bracket 26 to the frame 1 and at its rear end by means of a universally movable joint 29 and axle bracket 144 to the rigid axle housing 2 respectively.

Each carrier 36 further comprises a longitudinally extending torsion leaf spring bundle 4 serving as a lower suspension arm and connected at its forward end through anchor box 6 and arm 7 by the ball and socket joint 3 to the frame 1, and at its rear end through the anchor box 8 and arm 9 by the ball and socket joint 5 to the axle 2.

Multi-turn cushions 18 are placed a selected distance away from and extend with their support surfaces perpendicular to effective banking axes 15 which intersect the centers of the ball and socket joints 3. The lower carrier plates 14 for the multi-turn cushions 18 are supported by the arms 13 extending outwardly and rearwardly at approximately 45° from the anchor boxes 6 located at the forward ends of the torsional leaf spring bundles 4.

The multi-turn cushions 18 are supported against upper support plates 19 which are rigidly connected to threaded adjustment shafts 20 carried by the frame brackets 21 and regulated in their vertical positions by the adjustment nuts 22 as described above.

The multi-turn cushions 23 are also placed a selected distance away from and extend with their support surfaces perpendicular to effective axle banking hinge axes 32 which intersect the ball joints 5 as described for the structure illustrated in FIG. 1.

The carrier plate 24 for each multi-turn cushion in FIG. 13 is supported by the arm 145 extending from the corresponding anchor box 8 inwardly and substantially parallel to the axle 2.

The multi-turn cushions 23 are supported by support plates 146 which are rigidly connected to the axle 2 and part of bracket 144.

The rear axle suspension may be applied in principle for the support of the front end of the vehicle also, instead of the independent wheel suspension illustrated in FIG. 13 and vice versa.

A sway bar 58 is attached in the front of the vehicle to the frame 1 by the bearings 59. The outer ends of the sway bar 58 form longitudinally extending sway bar arms 60 which are connected by pivotal or rubber bearings 61 to inclined sway bar shackles 62. The shackles 62 are connected by pivotal or rubber bearings 63, which are spaced farther apart than the upper shackle bearings 61 to the outer ends of the transversely extending legs 42 of the lower front suspension arms 41.

In the rear of the vehicle, a similar sway bar 64 may be added and is illustrated as being attached by the bearings 65 to the frame 1. The sway bar 64 has longitudinally extending arms 66 on either end, which are connected by upper pivotal or rubber bearings 67 to inclined shackles 68 with lower pivotal or rubber bearings 69 also spaced farther apart than the upper pivots 67 connecting the shackles 68 to the rear axle housing 2.

The rear suspension forward anchor box 6 located on the right side of the vehicle in FIG. 13 carries an arm 147 extending inwardly with the ball and socket joint 148 on its end placed in or near the theoretical axis 33 which extends through the rear frame supported ball joint 3 and through the approximate center of the multi-turn cushion 18. This arm 147 constitutes part of a tie, provided in effect between the front and rear pairs of wheels to secure proper track holding for the vehicle.

A longitudinally extending tie rod 149 carries at its rear end the ball and socket joint 148 and at its forward end a ball and socket joint 150 which is carried by the substantially horizontally and transversely extending lever 151 disposed to turn about a substantially vertically extending pivot 152 supported by the frame 1.

A second longitudinally extending tie rod 153 carrying at its rear end the ball and socket joint 154 which is also supported by the lever 151 and carrying at its forward end the ball and socket joint 155, interconnects the lever 151 with a transversely extending lever 81 forming a bellcrank portion of the centrally located lever 46 in the front of the vehicle.

The vehicle illustrated in FIG. 13 operates in its geometric linkage and spring arrangement as described for FIG. 2 of this invention.

In FIG. 13, the front wheels 35 of the vehicle illustrated are shown as being steered by steering linkage assisted by a hydraulic power assist unit comprising a steering gear 156 supported by the frame 1 and operated from the driver's steering handwheel through the steering column 97. A Pitman arm 157 extends forwardly from the steering gear 96 to support a central tie rod 158 by means of a typical ball and socket joint. The tie rod 158 is supported on its free end by means of a ball and socket joint and a frame carried support lever 159 arranged to extend and swing substantially parallel to the Pitman arm 157.

In order to keep the steering system free of interference from the banking turn of the superstructure during curve ride, the outer wheel tie rods 101 and 102 are placed substantially in height of the upper front suspension control arms 37 which in effect constitute a neutral zone since no lateral shifting but only conventional vertical oscillation takes place between frame 1 and the ball joint 39 carried by the spindle member 40 during the banking turn of the superstructure.

An upper inner steering arm 160 extending backwardly is carried by a frame or gear housing supported shaft 161 which extends parallel to the Pitman arm shaft and is in outline and position coordinated to the overall steering geometry requirements and to a corresponding second upper inner steering arm 162 extending backwardly and vertically spaced in location relative to the support lever 159 on the other side of the vehicle. A common lever shaft 163 supports the support levers 159 and 162 and extends parallel to the shaft carrying the Pitman arm 157. The levers 159 and 162 are rigidly connected to operate in unison.

The outer ends of the wheel tie rods 101 and 102 are connected by ball and socket joints to the left and right steering arms 107 and 108 also placed approximately in height of the outer ends of the upper control arms 37 supported by the corresponding wheel spindle members 40. The arms 160 and 162 are connected by means of ball and socket joints to the inner ends of the wheel tie rods 101 and 102.

The arm 160 comprises also a forwardly extending section 164, the outer end of which is connected by means of a ball and socket joint to the bracket 165 extending from the tie rod 158. The levers 159 and 164 are designed to secure identical travel path for their corresponding ball joints during operation of the steering mechanism. This arrangement secures equal operation for both sides of the steering linkage under assist of the power steering mechanism illustrated and comprising a pump 166 and reservoir 167 supported and driven by the vehicle motor by means of a belt, not shown, and having its fluid pumped to a control valve 168 attached to the outer end of the center tie rod 158. A lateral movement of the Pitman arm supported stud ball 169 will shift the valve spool 170 in the selected direction, opening fluid channels designed to direct the fluid pressure to the corresponding side of the piston 171 slidingly arranged within the cylinder 172. The piston rod 173 is anchored on the frame 1 to secure the desired relative movement of the complete steering linkage.

To provide an adjustment means for balancing permanent one-sided loads and lateral shifts resulting, for instance, from car engine torque, from driving mostly on one side of crowned roads or from supporting an unusually heavy driver, FIGS. 13 and 14 illustrate an intermediate plate 174, interposed between the multi-turn cushion 55 and the support plate 56 on either side of the vehicle. This plate 174 is anchored to the top layer of the cushion 55 and may be lowered, moved fore or backwardly relative to the support plate 56 by turning the bolts 175 into plate 56 to engage selected indentation in the plate 174. A forward setting of plate 174 on one side and backward setting on the other side will exert a rotating effect on the superstructure relative to the running gear and overcome any "hanging" tendency due to the influencing factors described above.

An initial somewhat unsymmetrical design of the complete apparatus or selected parts thereof will also solve this particular problem of centering the superstructure.

A further novel mechanism is illustrated in FIGS. 13 and 15 as incorporated into the vehicle to secure a fixed center position of the superstructure relative to the running gear, whenever banking is to be blocked completely. Especially during alignment of the front end with regard to caster, camber, kinpin inclination and toe-in and for track setting, the device is useful. For this purpose tie rod 153 carries a disk plate 176 suitable to receive the forked end 177 of a bar 178 slidingly supported by the frame 1. A bell crank, comprising a substantially longitudinally extending arm 179 and a transversely extending arm 180 is pivotally supported by the frame. The forward end of arm 179 is pivotally engaging the bar 178, shifting it sidewardly and inwardly under longitudinal pressure exerted, forwardly directed, on arm 180, shifting the fork 177 to firmly engage the disk plate 176. A coil spring 181 connecting the forward pivot arm 179 with frame 1 and located a selected distance behind the support pivot for the bellcrank holds the fork 177 in either the "in" or "out" position, because in either position the spring 181 will have the least expansion.

The invention employs a multi-turn cushion to provide a variable axes universal joint connecting for a torsion spring roll bank arm. Stability of the vehicle is obtained by the sway bar connection of the roll banking arms of each pair and by the longitudinal connection between the pairs of roll banking arms. If desired additional stability may be obtained by the force diverter and power assist means coupled into the longitudinal connection referred to. Also, if desired, adjustable compensating means may be provided for unbalanced loads and temporary locking means may be provided to enable wheel alignment adjustment.

By locating the rear torque rod 25 on the driver side of the vehicle, the left side in American cars, the functioning of the tie rod is somewhat better balanced by the weight of the driver, particularly when no additional passengers are riding.

By employment of the load compensating adjusting means illustrated in FIG. 14, it has been found possible to eliminate the more complicated centering spring 109 shown in the construction illustrated in FIG. 2.

The construction, particularly that of FIG. 13 has been greatly simplified and eliminates the cost and necessity for shock absorbers, as in the rear mounting. The ride characteristics of a vehicle with this construction has been found to be substantially superior to those of all present day passenger vehicles.

Various modes of carrying out the invention are contemplated as being within the scope of the following claims particularly pointing out and distinctly claiming the subject matter which is regarded as the invention.

I claim:

1. In a device of the class described having a torsion spring with its opposite ends secured to corresponding support members by universally movable ball joints and lever arms connecting the spring to the corresponding support member in a manner to effect torsional actuation of the spring by relative movement of the support members in a plurality of directions, one of said support members constituting an unsprung mass disposed to be driven over a road having straight and curved portions therein, and the other of said support members constituting a sprung mass carried by said first named support members and subjected to forces arising from acceleration and deceleration, uneven roadbeds and from curves in the road, a multi-turn cushion incorporated in at least one of said lever arm connections to reduce the tendency for distortion of the torsion spring, and comprising a rubber block normally compressed in a direction of torsion spring load by said support members and resiliently yieldable in directions other than said compression direction to provide for guiding relative movement of said support members.

2. In a device of the class described having a torsion spring with its opposite ends secured to corresponding support members by universally movable ball joints and lever arms connecting the spring to the corresponding support members in a manner to effect torsional actuation of the spring by relative movement of the support members in a plurality of directions, one of said support members constituting on unsprung mass disposed to be driven over a road having straight and curved portions therein, and the other of said support members constituting a sprung mass carried by said first named support members and subjected to forces arising from acceleration and deceleration, uneven roadbeds and from curves in the road, a multi-turn cushion incorporated in each of said lever arm connections to reduce the tendency for distortion of the torsion spring and to provide greater stability for the sprung mass under lateral forces on curves.

3. In a device of the class described having a plurality of torsion springs with their opposite ends secured to corresponding support members by universally movable ball joints and lever arms connecting the spring to the corresponding support member in a manner to effect torsional actuation of the spring by relative movement of the support members in a plurality of directions, one of said support members constituting an unsprung mass disposed to be driven over a road having straight and curved portions therein, and the other of said support members constituting a sprung mass carried by said first named support members and subjected to forces arising from acceleration and deceleration, uneven roadbeds and from curves in the road, each said torsion spring comprising a tightly arranged multiple leaf spring having a rectangular box encasing the same at at least one end, said box carrying the necessary support lever arm connections for the corresponding end of said spring, and a multi-turn cushion incorporated in each of said lever arm connections to reduce the tendency for distortion of the torsion spring and to provide greater stability for the spring mass under lateral forces on curves.

4. In a banking vehicle of the class described having a superstructure and means supporting the same upon a road and providing for lateral shifting of the superstructure to a banked position on curves, a substantially self-locking reduction gearing carried by the superstructure and connected to said support means to block relative lateral shifting between the superstructure and the support means tending to result from road shock forces, and a laterally movable mass responsive to centrifugal forces arising when the vehicle negotiates a turn and connected to said reduction gearing to adjust the same for corresponding lateral shifting of the superstructure to a banked position; said last named connection comprising a metallic leaf spring disposed on edge and extending longitudinally of the vehicle with one end thereof fixed to the vehicle superstructure and the other end thereof carrying said mass and free for lateral movement of the mass by flexing of said spring, power means disposed to assist in the adjustment of said gearing by said mass, and valve means actuated in response to movement of said mass to control said power means.

5. In a vehicle of the class described having a superstructure, a banking support for the superstructure and comprising a plurality of cooperating roll banking arms, each including a torsion member connecting the superstructure to the unsprung mass of the vehicle, a lever arm at one end of said torsion member bearing against a resilient multi-turn cushion substantially of solid rubber of medium durometer and normally compressed under the load of said superstructure, and a ball joint offset from said cushion at the corresponding end of said torsion member and constituting the connection therefor to the superstructure and thereby control the roll movement of the superstructure at all times.

6. The construction of claim 5 in which said resilient roll banking arm includes a torsion spring connected at one end to said support means and at the other end to said superstructure by said ball joint, and a lever arm secured to the latter end of said torsion spring and connected to said superstructure by said resilient multi-turn cushion.

7. The construction of claim 6 in which said banking support comprises at least two pairs of wheels with a corresponding roll banking arm connection for each wheel disposed to act in unison to provide banking of the superstructure on turns.

8. A vehicle comprising a superstructure adapted to roll bank on turns, resilient means stressed in torsion for the support of the superstructure, pairs of opposed effective roll banking arms comprising said resilient means and disposed to carry the superstructure, the arms of each pair being spaced laterally apart on opposite sides of the longitudinal vertical center plane of the vehicle, each effective roll banking arm of at least one pair extending between the superstructure and a rigid axle support therefor with the ends of the arms for each pair of effective roll banking arms embodying in effect a universally movable joint resiliently controlled in its movement at one corresponding end of each arm and a skew pivotally effective banking axis at the other end of the arms, said skew pivotally effective banking axes each constituting one axis of an effective universal joint comprising a support ball joint and a multi-turn cushion operating in unison to form in effect said effective universal joint with said one axis thereof extending substantially inclined to the road and the other axis thereof extending substantially horizontally, and with both said axes extending inclined towards said center plane and intersecting said center plane at points located above the road and spaced farther away from the corresponding rigid axle than the center point of the corresponding universally movable joint, said effective universal joint being arranged to turn in unison with the superstructure about the longitudinally and horizontally extending center axis of the superstructure in opposition to said resilient means, said effective universally movable joints each comprising a support ball joint, a multi-turn cushion and said resilient means operating in unison to establish said last-named effective universally movable joint, whereby said resilient means for the pair of effective roll banking arms are increasingly torsionally stressed during upward movement of the pair of wheels supporting the corresponding end of the superstructure and are further increasingly stressed on that side of the vehicle on which the corresponding wheel maintains its position relative to the superstructure while the other wheel of the pair moves downwardly relative to the superstructure, and wherein said resilient means for the support of the superstructure constitute leaf spring bundles with the majority of the leaves placed in a substantially upright position to resist undesirable bending deflection.

9. A vehicle comprising wheels carried by wheel supporting members and supporting a superstructure adapted to roll bank on turns, resilient means stressed in torsion for the support of the superstructure, pairs of opposed effective roll banking arms comprising said resilient means and disposed to carry the superstructure, the arms of each pair spaced laterally apart on opposite sides of the longitudinal center plane of the vehicle, each effective roll banking arm extending between the superstructure and the effective road support therefor with each end of each arm for at least one pair of effective roll banking arms wherein a rigid axle constitutes the wheel support member, comprising a support ball joint, a multi-turn cushion spaced a selected distance away from each corresponding support ball joint and connecting said arm respectively to the superstructure at one end and to the corresponding wheel supporting member at the other end, said support ball joints and multi-turn cushions operating in unison to create effective banking turn axes and effective wheel oscillation axes for said wheel supporting members relative to said superstructure, and wherein said resilient means for the support of the superstructure constitute leaf spring bundles with some of the leaves placed in a substantially vertical position to resist bending in a horizontal plane and the remaining leaves placed in a substantially horizontal position to resist bending deflection in a vertical plane.

10. A vehicle comprising a superstructure adapted to roll bank on turns, a set of front roll banking arms and a set of rear roll banking arms disposed to support each corresponding end of the superstructure upon a pair of wheels, each set being connected to the superstructure and constituting at least a pair of opposed roll banking arms spaced laterally apart on opposite sides of the longitudinal center line of the superstructure and extending from the superstructure to the effective road support therefor with the ends of the arms for each pair of roll banking arms embodying in effect a universally movable joint at one corresponding end of each arm and a skew pivotally effective banking axis at the other end of the arm, means including a longitudinally extending center lever located intermediate the front wheels and interconnecting the roll banking arms of the corresponding pair to retain said effective universally movable joints for the corresponding pair in substantially constant spaced relation, each roll banking arm for the pair of roll banking arms in the front of the vehicle including a wheel suspension arm comprising a transversely and a longitudinally extending leg, a kingpin banking hinge pivotally interconnecting the outer end of said longitudially extending leg to said transverse leg and placed to control the turn of the roll banking arm about said skew pivotally effective banking axis, the inner end of each longitudinally extending leg being connected by a support ball joint and a multi-turn cushion placed a selected distance from said support ball joint to the superstructure, the longitudinally extending leg of each suspension arm constituting the resilient support for the corresponding part of the superstructure, the transversely extending leg having its outer end carried by a steerable wheel and its inner end pivotally carried by said center lever, each roll banking arm for the pair of roll banking arms at the rear end of the vehicle comprising additional resilient means and related guiding means including support ball joints and multi-turn cushions disposed to roll the superstructure into a banked position during curve ride, a tie interconnecting the front and rear superstructure support structure, a substantially self-locking reduction gearing carried by the superstructure and connected to said tie to block relative lateral shifting between the superstructure and the wheels tending to result from wheel road shock forces, and hydraulic means actuated by means movable in response to lateral forces to operate said reduction gearing in a direction adjusting said blocking to provide for movement of said tie and banking of the superstructure.

11. A vehicle comprising a superstructure adapted to roll bank on turns, a set of front roll banking arms and a set of rear roll banking arms disposed to support each corresponding end of the superstructure upon a pair of wheels, each set being connected to the superstructure and constituting at least a pair of opposed roll banking arms spaced laterally apart on opposite sides of the longitudinal center line of the superstructure and extending from the superstructure to the effective road support therefor with the ends of the arms for each pair of roll banking arms embodying in effect a universally movable joint at one corresponding end of each arm and a skew pivotally effective banking axis at the other end of the arm, each roll banking arm including an upper wheel suspension arm connected with the superstructure to assist in guiding the outer end of the roll banking arm, means interconnecting the roll banking arms of the corresponding pair to retain said effective universally movable joints for the corresponding pair in substantially constant spaced relation, each front roll banking arm including a wheel suspension arm comprising a transversely and a longitudinally extending leg, said longitudinally extending legs comprising leaf spring bundles with the majority of the leaves placed in a substantially upright position to resist undesirable bending deflection, and a kingpin banking hinge pivotally interconnecting the outer end of said longitudinally extending leg to said transverse leg and disposed to control the turn of the roll banking arm about said skew pivotally effective banking axis, the inner end of each longitudinally extending leg being connected to the superstructure by a support ball joint and a multi-turn cushion placed a selected distance from said support ball joint, and the transversely extending leg having its outer end carried by a steerable wheel and its inner end pivotally carried by said interconnecting means.

12. The combination of claim 11 wherein steering of the front wheels is secured by a pair of outer steering tie rods arranged in the height of the upper wheel suspension arms, each upper wheel suspension arm is pivotally carried by a spindle support member carried in turn by the corresponding wheel, each tie rod extending substantially parallel to the corresponding upper suspension arm located on either side of the vehicle and being supported at its outer end by a steering arm carried by the spindle support member and at its inner end by a longitudinally extending superstructure supported upper steering support arm and operated by steering linkage and mechanism supported by the superstructure and comprising a center steering tie rod, handwheel operated steering gear carried by a steering gear housing, and a pair of lower steering support arms carried by the superstructure and substantially parallel to the corresponding upper steering support arms, said lower steering support arms being connected to opposite ends of said center steering tie rod and to the corresponding upper steering support arm to turn with the latter, and said center tie rod connecting said lower steering support arms being arranged to operate the same substantially in unison during steering operation of the vehicle.

13. The combination of claim 11 wherein said longitudinally extending leg constituting the resilient support for the corresponding part of the superstructure is an anchor box supported torsion spring comprising a leaf spring bundle with some of the leaves placed in a substantially upright position and the remaining leaves placed in a substantially horizontal position, said spring assembly connected to the superstructure by an effective two-axes universal joint comprising a support ball joint and a multi-turn cushion spaced a selected distance away from said support ball joint and arranged to provide the banking travel path for the other end of the leg.

14. A vehicle comprising a superstructure adapted to roll bank on turns, a set of front and a set of rear wheel carriers disposed to support said superstructure and spaced longitudinally of the same, each front wheel carrier comprising a wheel spindle member, an upper wheel suspension arm pivotally connected at its inner end to the superstructure, a ball and socket joint connecting said arm to said wheel spindle member, a lower wheel suspension arm composed of a transversely and a longitudinally extending leg, an effective universal joint comprising a support ball joint and a multi-turn cushion spaced a selected distance away from said support ball joint, said effective universal joint connecting each longitudinally extending leg at its inner end to the superstructure, an inclined kingpin banking hinge connecting each longitudinally extending leg at its outer end to the corresponding transverse leg intermediate the ends of the latter, a pivotal support for the inner ends of said transverse legs pivotally carried by the superstructure, and a ball and socket joint connecting the outer end of each transverse leg to the corresponding wheel spindle member, each rear wheel carrier extending between the superstructure and the outer end of a rigid drive axle and comprising a torsion spring attached at each end to an effective universal joint constructed by means of a support ball joint and a multi-turn cushion spaced a selected distance away from said support ball joint, whereby said effective universal joints for each arm are arranged to rotate relative to each other during wheel oscillation and wherein said torsion spring constitutes a leaf spring bundle and at least one stabilizer bar carried by the superstructure and connected by inclined shackles to the corresponding wheel carriers.

15. A vehicle comprising a superstructure adapted to roll bank on turns, a set of front and a set of rear wheel carriers disposed to support said superstructure and spaced longitudinally of the same, each front wheel carrier comprising a wheel spindle member, an upper wheel suspension arm pivotally connected at its inner end to the superstructure, a ball and socket joint connecting said arm to said wheel spindle member, a lower wheel suspension arm composed of a transversely and a longitudinally extending leg, an inclined kingpin banking hinge connecting each longitudinally extending leg at its outer end to the corresponding transverse leg intermediate the ends of the latter, a pivotal support for the inner ends of said transverse legs pivotally carried by the superstructure, a ball and socket joint connecting the outer end of each transverse leg to the corresponding wheel spindle member, and a lever means stabilizing the position of said pivotal support to control the banking of the superstructure on turns, said longitudinally extending legs constituting torsionally operated resilient means for the support of the superstructure and connected to the superstructure by effective universal joints comprising support ball joints and multi-turn cushions placed a selected distance away from said support ball joints, the superstructure being resiliently supported with its front end upon said front wheel carriers, each rear wheel carrier including a longitudinally extending lower suspension arm connected at one end to the rear axle by an effective double hinged universal joint comprising a support ball joint and a multi-turn cushion placed a selected distance away from said support ball joint with one of the two hinges of the effective universal joint positioned to serve substantially as an effective roll banking hinge, and the other hinge serving substantially as an oscillation hinge and connected at the other end to the superstructure by an effective universal joint comprising a support ball joint and a multi-turn cushion placed a selected distance away from said support ball joint, said last-named effective universal joint comprising one hinge serving substantially as an effective roll banking hinge correlated to the first-named roll banking hinge and extending inclined to the road and to the longitudinal vertical center plane of the vehicle and comprising another hinge extending substantially parallel to the road and serving as an oscillation hinge for the corresponding rear wheel carrier and arranged inclined in plan view to the first named hinge of said last named rearwardly located universal joint, and a front-to-rear tie connecting at least one wheel carrier disposed at each end of the vehicle to induce the front and rear wheel carriers to move laterally substantially in unison during the roll banking of the superstructure, means connecting the superstructure and said front-to-rear tie and including substantially irreversible gear mechanism rigidly preventing relative lateral movement between the wheels and the superstructure, means including hydraulic pressure means to release said preventive means to permit relative lateral movement between the superstructure and the running gear for banking of the superstructure, additional resilient means for stabilizing the position of the superstructure relative to the wheels and to induce banking, and wherein said resilient means for the support of the superstructure comprise leaf spring bundles with the majority of the leaves placed in a substantially upright position.

16. In a motor vehicle, a superstructure, a running gear including at least one wheel supported rigid axle, front and rear linkage means mounting said superstructure to said running gear, said linkage means including elements disposed on opposite sides of the longitudinal vertical center plane of the vehicle, each rear element comprising a pair of vertically spaced longitudinally extending arms, an effective two-axes universal joint comprising a support ball joint and a multi-turn cushion placed a selected distance away from said ball joint and arranged to provide the effective axes for said effective universal joint and connecting one end of one of said longitudinally extending arms to the superstructure with one of the axes extending substantially horizontally and inclined to said center plane and intersecting said center plane at a point located a greater distance away from the corresponding rigid axle than the center of said universal joint, and with the other of the axes extending inclined upwardly toward said center plane, a second effective two-axes universal joint comprising a support ball joint and a multi-turn cushion placed a selected distance away from said ball joint and arranged to provide the effective axes for said second effective universal joint and connecting the other end of said arm to the rigid axle with one of the axes extending substantially horizontally and transversely and with the other extending substantially inclined upwardly toward said center plane, said arm of the pair of arms supported by said effective universal joints constituting a torsionally actuated resilient support for the corresponding share of the superstructure, and universally movable joints connecting the other arm of the pair at one end to the superstructure and at the other end to the axle, whereby the wheel rates established by the wheel upward movement of the pair of wheels supporting said rigid axle are substantially the same for one wheel up movement with the other wheel stationary and for one wheel up movement with the other wheel down movement, all up movement constituting a vertical movement of the corresponding wheel towards the frame, and wherein additional resilient support is furnished by said multi-turn cushions.

17. A vehicle, comprising a superstructure adapted to roll bank on turns and supported by pairs of wheels, at least one pair of said wheels supporting a rigid axle structure, resilient means for the support of the superstructure, comprising longitudinally extending suspension arms for said wheels constituting a pair of opposed effective roll banking arms for each pair of wheels, the arms of each pair being spaced laterally apart on opposite sides of the longitudinal vertical center plane of the vehicle, at least one pair of said effective roll banking arms extending between the superstructure and said rigid axle structure with the ends of the corresponding suspension arms for said last-named effective roll banking arms embodying in effect an effective double hinged universal joint comprising a support ball joint and a multi-turn cushion placed a selected distance away from said ball joint at each corresponding end of each arm, the effective universal joints connecting said last-named suspension arms to the rigid axle having the axes of the corresponding hinges thereof serving predominantly the oscillation movements of the corresponding wheels disposed parallel to the axis of the corresponding wheel spindles carried by said rigid axle, and having the axes of the corresponding hinges thereof predominantly serving the banking movements for the superstructure intersecting the transversely extending vertical plane containing the axis of said wheel spindles at an angle of approximately 30°.

18. A vehicle generally of the passenger automobile type, comprising a superstructure, a pair of roll banking arms cooperating to support the front end of said superstructure upon the road, a pair of drive wheels connected by a rigid axle structure, a pair of roll banking arms cooperating to support the rear end of said superstructure upon said rigid axle structure, and a sway bar carried at each end of the superstructure transversely thereof with its opposite ends connected to the outer end of the corresponding banking arm to control relative vertical movement between the corresponding wheel and the superstructure during both straight ahead ride and banking; each of said forward banking arms comprising upper and lower substantially horizontal laterally extending control arms providing a kingpin steering support for the corresponding wheel, a pivotal connection between the upper control arm and the superstructure, a universally movable laterally shiftable pivotal connection between said lower control arm and said superstructure, a torsion spring extending substantially horizontally and longitudinally of the vehicle and having its forward end secured to said lower control arm by a pivotal hinge inclined to the longitudinal and transverse vertical center planes of the vehicle in a direction to provide torsional stressing of said spring under vertical load of the superstructure and to vary said torsional stressing in response to lateral shifting of the superstructure relative to the corresponding wheel, a universally movable connection between the rear end of said torsion spring and the superstructure, and a multi-turn cushion additionally connecting the rear end of said torsion spring and the superstructure and offset from the torsion axis of said spring to be loaded in compression by torsion stressing of the spring by the vertical load of the superstructure, said cushion being yieldable to provide for lateral shifting of the forward end of the torsion spring relative to the superstructure during banking of the latter.

19. A vehicle generally of the passenger automobile type, comprising a superstructure, a pair of roll banking arms cooperating to support the front end of said superstructure upon the road, a pair of drive wheels connected by a rigid axle structure, a pair of roll banking arms cooperating to support the rear end of said superstructure upon said rigid axle structure, and a sway bar carried at each end of the superstructure transversely thereof with its opposite ends connected to the outer end of the corresponding banking arm to control relative vertical movement between the corresponding wheel and the superstructure during both straight ahead ride and banking; each of said rear banking arms comprising a torsion spring extending generally horizontally and longitudinally of the vehicle, a universally movable joint connecting the forward end of said torsion spring and the superstructure near the torsion axis of the spring, a universally movable joint connecting the rear end of said torsion spring and the axle structure near the torsion axis of the spring, a lever arm carried by each end of said torsion spring, a multi-turn cushion disposed between the forword lever arm and the superstructure and subject to compression by said torsion spring in response to the vertical load of the superstructure, and a multi-turn cushion disposed between the rear lever arm and the axle structure and subject to compression by said torsion spring in response to the vertical load of the superstructure, both of said multi-turn cushions being yieldable laterally to prevent distortion of said torsion spring during banking and to guide the superstructure into a banked position on turns.

20. In a vehicle of the class described having a superstructure supported by a pair of forward roll banking arms including front steerable wheels and a pair of rear roll banking arms supporting the superstructure upon a wheel supported rigid axle structure, each of said rear banking arms comprising a torsion spring extending generally horizontally and longitudinally of the vehicle, a universally movable joint connecting the forward end of said torsion spring and the superstructure near the torsion axis of the spring, a universally movable joint connecting the rear end of said torsion spring and the axle structure near the torsion axis of the spring, a lever arm carried by each end of said torsion spring, a multi-turn cushion disposed between the forward lever arm and the superstructure and subject to compression by said torsion spring in response to the vertical load of the superstructure, and a multi-turn cushion disposed between the rear lever arm and the axle structure and subject to compression by said torsion spring in response to the vertical load of the superstructure, both of said multi-turn cushions being yieldable laterally to prevent distortion of said torsion spring during banking and to guide the superstructure into a banked position on turns.

21. The construction of claim 19 in which at least one of the multi-turn cushions is provided with adjustment means to generally compensate for one sided loading of the vehicle.

22. The construction of claim 19 and means interconnecting the front and rear pairs of roll banking arms to maintain coaction therebetween and stabilize tracking of the vehicle.

23. The construction of claim 19 and a member movable in response to lateral shifting between the superstructure and the outer ends of said roll banking arms, means carried by the superstructure and adapted to be actuated into engagement with said member to block movement thereof.

24. In a device of the class described having a superstructure supported by a pair of forward roll banking arms and a pair of rear roll banking arms, each of said roll banking arms comprising a torsion spring with one end connected to the superstructure and the other end connected to a corresponding wheel support member in a manner to effect torsional actuation of the spring by relative movement between the superstructure and the wheel support members in a plurality of directions, at least one of said connections comprising a universally movable ball joint, a lever arm carried by said spring laterally offset from said ball joint, and a multi-turn cushion disposed between said lever arm and the superstructure or support member to which said ball joint connects said spring, said multi-turn cushion serving to reduce distortion of said torsion spring.

References Cited by the Examiner
UNITED STATES PATENTS

| | | | |
|---|---|---|---|
| 2,063,216 | 12/36 | Zaparka | 267—15 X |
| 2,739,658 | 3/56 | Kolbe | 280—112 X |
| 2,788,986 | 4/57 | Kolbe | 280—112 |
| 2,820,646 | 1/58 | Kolbe | 280—112 |
| 2,854,232 | 9/58 | Boschi | 267—63 |
| 2,960,350 | 11/60 | Broughton | 267—63 X |
| 3,020,856 | 2/62 | Hirst | 267—63 X |

FOREIGN PATENTS 613,001 11/48 Great Britain.

A. HARRY LEVY, *Primary Examiner.*

LEO FRIAGLIA, *Examiner.*

UNITED STATES PATENT OFFICE
CERTIFICATE OF CORRECTION

Patent No. 3,181,883                                           May 4, 1965

Joachim Kolbe

It is hereby certified that error appears in the above numbered patent requiring correction and that the said Letters Patent should read as corrected below.

Column 1, line 38, for "fraction" read -- friction --; column 2, line 35, for "stering" read -- steering --; column 11, line 59, beginning with "The wheels 35" strike out all to and including "of the vehicle." in line 61, same column 11; column 19, line 30, for "of" read -- for --.

Signed and sealed this 12th day of October 1965.

(SEAL)
Attest:

ERNEST W. SWIDER
Attesting Officer

EDWARD J. BRENNER
Commissioner of Patents